No. 776,644. PATENTED DEC. 6, 1904.
M. R. CONWAY.
FRICTION CLUTCH.
APPLICATION FILED SEPT. 2, 1903.
NO MODEL.
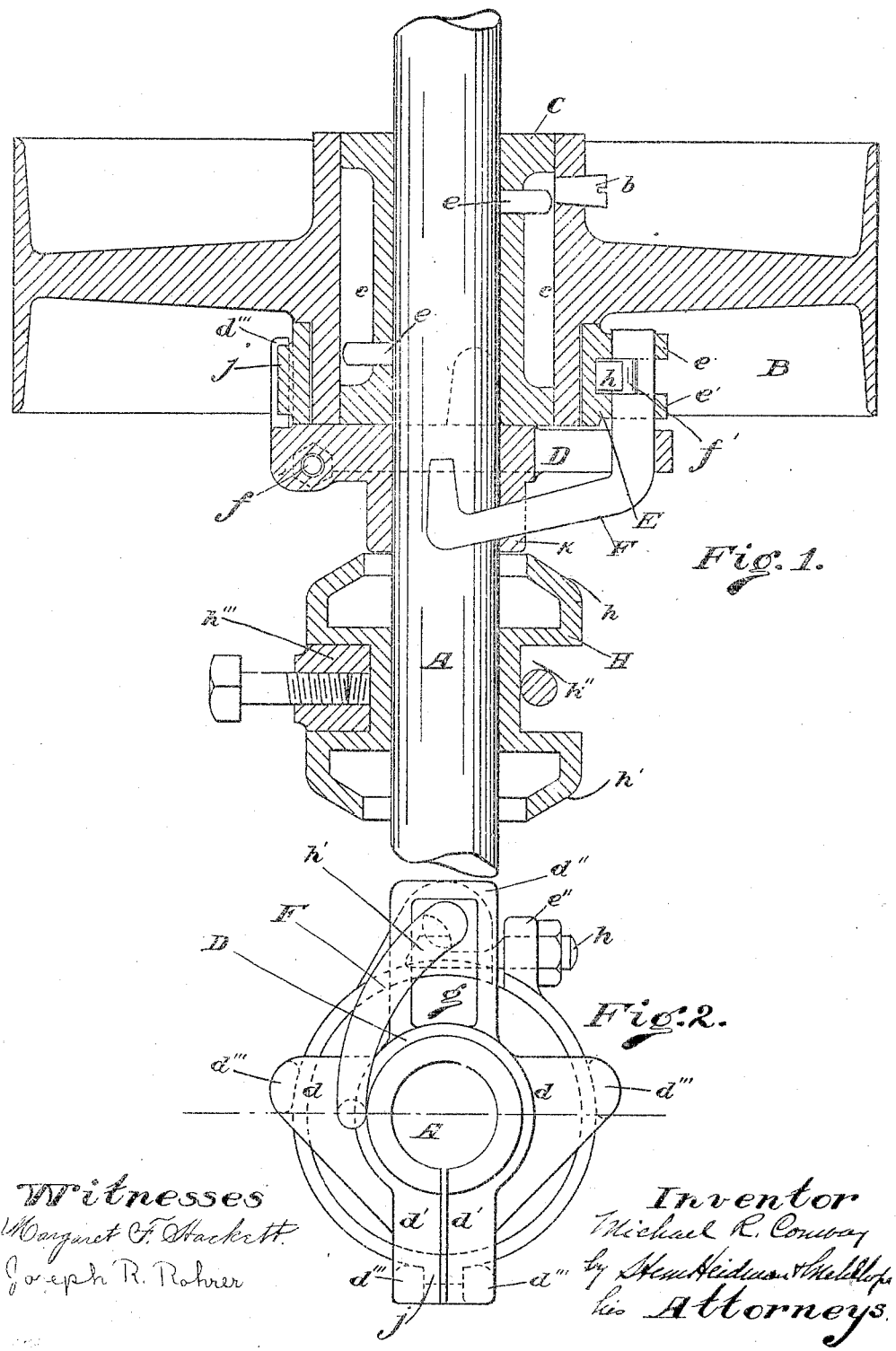

No. 776,644.

Patented December 6, 1904.

UNITED STATES PATENT OFFICE.

MICHAEL R. CONWAY, OF CINCINNATI, OHIO, ASSIGNOR TO CONWAY & COMPANY, OF CINCINNATI, OHIO, A PARTNERSHIP.

FRICTION-CLUTCH.

SPECIFICATION forming part of Letters Patent No. 776,644, dated December 6, 1904.

Application filed September 2, 1903. Serial No. 171,683. (No model.)

*To all whom it may concern:*

Be it known that I, MICHAEL R. CONWAY, a citizen of the United States, and a resident of the city of Cincinnati, county of Hamilton, and State of Ohio, have invented a certain new and useful Improvement in Friction-Clutches, of which the following is a full, clear, and exact description, reference being had to the accompanying drawings, which form a part of my specification.

My invention relates to an improvement in a friction-clutch whereby the power from the drive-shaft may be transmitted to the pulley or pulleys loosely mounted thereon, and has for its object the production of a simple and sensitive clutch which may be readily applied and so constructed that the wear incident to devices of this sort is greatly reduced and the strain distributed, my purpose being also to produce a friction-clutch which would be rather inexpensive in manufacture.

In the drawings, Figure 1 is a longitudinal sectional view of my improved friction-clutch properly assembled and mounted on a drive-shaft in connection with a loosely-mounted pulley. Fig. 2 is a side or end view of Fig. 1 with the thimble omitted.

In the specification, like letters of reference will indicate identical parts in different figures.

A is a portion of a shaft on which is loosely mounted the pulley B.

C is a sleeve or bush which fits on the shaft A and into the hub $b$ of the pulley B. This sleeve or bush is so constructed as to leave a chamber $c$ between the inner circumference of the hub $b$ of the pulley and the sleeve or bush, which chamber is to be used as an oil reservoir or chamber, so that the various revoluble parts may be sufficiently lubricated at all times. The sleeve or bush C is provided with one or more apertures, into which may preferably be driven wooden plugs $e\ e$, which will enable the oil to work through to the shaft A, thus providing automatic lubrication for these parts. Of course it will be understood that the hub $b$ may be provided with an opening therethrough at a point above the chamber $c$ to permit of the replenishing of this chamber $c$ with oil from time to time, the opening being of course provided with a screw-plug or some means for preventing the escape of the oil from the chamber $c$. This plug or opening should be placed on the opposite side of the hub $b$ from that on which my improved clutch is adapted to engage. It has been found that when the shaft, with the pulley, is rapidly revolved any oil that might be in the chamber $c$, especially if but a small quantity is in the chamber, by centrifugal force will be thrown against the upper wall of the chamber, and for this reason I have found it desirable to have plugs $e\ e$, which may be of wood or any other porous material, extend sufficiently up into the oil-chamber so as to be at all times in contact with the oil in the chamber.

Secured to the shaft A at a point adjacent the pulley B is a carrier D, which is preferably constructed with extensions $d\ d$ and $d'\ d'$ and $d''$, the projections $d\ d$ and $d'\ d'$ being provided with lugs $d'''$, extending at right angles thereto. The carrier D is drawn together and tightly held on the shaft A by means of the bolt $f$, (see Fig. 1,) thus making the carrier D to revolve with the shaft. The extension $d''$ on the carrier D is provided with a slotway $g$, as is seen in Fig. 2.

E is a friction-band which is adapted to take over the hub $b$ of the pulley, the friction-band being provided with ears $e'\ e'$ (see Fig. 1) and ear $e''$. (See Fig. 2.)

F is a lever which has its bearings in the ears $e'\ e'$ of the friction-band E and takes through the slotway $g$ in the extension $d''$ of the carrier D. The ear $e''$ of the friction-band forms a thrust-bearing for the key or latch $h$, as more clearly seen in Fig. 2, the key or latch being retained in place by a nut screwed on its end, as indicated. The lever F is provided with a slot or cut-out portion $f'$, (see Fig. 1,) so that the lever F may take into and have operative contact with the key or latch $h$, which is provided with the hook end $h'$. It will be seen that by lifting the free end of the lever F the sharp edge or wall of the slot therein will bear against the hook end $h'$ of the latch $h$ and compel the ears $e'$ and $e''$ to be drawn together, and thus reduce the circumference of the band E. The friction-band E being loosely mounted on the hub of the pulley, its entire inner circumference is brought into contact with the hub, and thus undue wear or friction at any one point, as is true with the constructions heretofore used, is obviated. Mounted on the shaft A and adjacent the carrier D is what may a termed a "thimble" H, preferably of the construction illustrated in the drawings, the thimble being provided with conical ends $h'$ and a central groove $h''$, into which groove fits the yoke $h'''$, whereby the shifting bar or lever is secured to the thimble. The conical ends $h'$ of the thimble H are extended and so constructed to pass freely over the hub $k$ of the carrier D, thus also economizing shifting space on the shaft. The friction-band E is also provided with a lug $j$, which is adapted to fit between the lugs $d''' d'''$ on the projections $d'$ of the carrier D, as may be seen in Fig. 1.

The operation of my improved friction-clutch is as follows: By means of a shifting bar or lever the thimble H is moved toward the carrier D, which latter is securely clamped to the drive-shaft A, the conical ends $h'$ of the thimble fitting over the hub $k$ of the carrier. The conical ends of the thimble H come into contact with the lever F, and the free end of the latter is pressed outward and away from the carrier D and made to ride on the top of the thimble H, the free end of the lever F preferably being bent, as illustrated, to form a heel which is adapted to ride on the thimble H when the thimble is thrown over against the carrier D. By throwing the thimble H toward the carrier D and raising the free or heel end of the lever F the lever F is oscillated and the wall of the slot $f'$ made to engage with the hook end of the key or latch $h$, thereby drawing the ends of the friction-band A together, and thus making the surfaces of the hub $b$ of the pulley B and the inner circumference of the friction-band E to contact, and the pulley B is made to move with the shaft A by reason of the fact that the lever F passes through the slot in the projections $d''$ on the carrier D, which latter is securely keyed to the shaft.

I prefer to construct the lever F in the manner shown in the drawings with a round body and bent so as to have the free or heel end thereof to lie in the path of the thimble H, the object of my construction of lever being to take the side thrust given by the thimble H away from the bearing in the ears $e' e'$.

It is apparent by constructing the key or latch $h$ and the lever F as shown and described that any wear, should there be any, can be readily taken up, and the parts can also be quickly taken apart for the purpose of repair and the like.

By constructing the extension $d''$ as shown, having the slot $g$, through which the lever F passes, it will be seen that the upthrust to which the lever is subject will be taken care of by the extension $d''$ and the strain taken from the ears $e'$. By having the carrier D securely clamped to the shaft A at the point indicated in the drawings it will be seen that it will also act as a collar for the pulley B, holding the same in position. Of course the friction-band E is bored a little larger than the hub $b$, so that it will not contact therewith when at rest, and a sufficient opening is also left between the ends of the friction-band E to allow the same to contact with the surface of the hub $b$ of the pulley B and also to allow for wear. The arms or extensions $d\ d$ and $d'\ d'$, with their lugs $d''$, clasp the friction-band E and tend to hold it concentrically and away from the hub $b$ of the pulley B, and thus prevent any unnecessary wear, as would be the case should the friction-band be allowed to loosely ride or come in contact with the hub $b$.

The advantages of my improvement are apparent, and it is also possible to slightly modify the construction shown and described without getting away from the spirit of my invention, and I do not wish to be understood as limiting myself to the exact construction herein described; but What I do claim as my invention, and wish to secure by Letters Patent, is—

1. A friction-clutch mechanism comprising a shaft, a member loosely rotating thereon, a friction-band, means intermediate of and controllably connecting the ends of said band whereby they are drawn together, a carrier secured to said shaft adjacent the loosely-rotating member and the friction-band, a lever whose one end takes through said carrier and through a portion of said band and is operatively connected with the means intermediate of the ends of said band, mechanism slidably mounted on said shaft at a point adjacent the carrier, and means whereby said slidably-mounted mechanism is slid into contact with said lever, substantially as shown and in the manner described.

2. A friction-clutch mechanism comprising a loosely-rotating member mounted on a shaft, in combination with a split band adapted to encircle a portion of said loosely-rotating member, a carrier rigidly secured to said shaft adjacent the loosely-rotating member and said split band, an angular lever adapted to take through said carrier and be connected with one end of said split band, mechanism slidably mounted on the shaft adjacent the carrier and adapted to contact with the free end of said lever, mechanism intermediate of the said lever and the other end of said split band whereby the action of the lever is transmitted to the ends of said split band, and means whereby the slidably-mounted mechanism is shifted into operative contact with said lever, substantially in the manner and for the purpose described.

3. A friction-clutch mechanism comprising a loosely-rotating member mounted on a shaft, in combination with a friction-band provided with oppositely-disposed lugs, means intermediate and controllably connecting the ends of said band whereby they are drawn together, a carrier secured to the shaft adjacent the loosely-rotating member and the friction-band, said carrier provided with extensions so constructed as to hold the friction-band concentrically and normally away from the loosely-rotating member, an angular lever whose one end takes through said carrier and through oppositely-disposed lugs on the friction-band and has operative connection with said means intermediate of the ends of said band, mechanism slidably mounted on the shaft adjacent the carrier, and means whereby said slidably-mounted mechanism is slid into contact with said lever, substantially in the manner and for the purpose described.

4. A friction-clutch mechanism comprising a loosely-rotating member mounted on a shaft, in combination with a split band adapted to encircle a portion of said loosely-rotating member, a carrier rigidly secured to the shaft adjacent the loosely-rotating member and said band, said carrier so constructed as to hold the friction-band concentrically and normally away from the loosely-rotating member, an angular lever adapted to take through said carrier and be connected with the one end of said split band, mechanism slidably mounted on the shaft adjacent the carrier and adapted to contact with the free end of said lever, and means intermediate of said lever and the other end of said split band whereby said end of the split band is controlled by the action of the lever, and mechanism whereby the slidably-mounted mechanism is thrown into operative contact with the free end of said angular lever, substantially as shown and for the purpose described.

5. A friction-clutch mechanism comprising a shaft, a member loosely rotating thereon, in combination with a split friction-band provided with ears, a carrier secured to said shaft adjacent the loosely-rotating member and the friction-band, an angular lever whose one end takes through said carrier and the ears of said friction-band and is adapted to oscillate, mechanism slidably mounted on the shaft adjacent the carrier, means whereby said slidably-mounted mechanism is thrown into contact with the free end of said lever, and mechanism connected with the friction-band and adapted to be operated on when said lever is oscillated, substantially in the manner and for the purpose described.

6. A friction-clutch mechanism comprising a shaft, a member loosely rotating thereon, in combination with the split friction-band provided with ears near the ends of said band, a carrier secured to said shaft adjacent the loosely-rotating member and the friction-band, an angular lever whose one end takes through said carrier and the ears on one end of said split band and adapted to oscillate, mechanism slidably mounted on the shaft adjacent the carrier, means for moving said slidably-mounted mechanism toward the carrier, whereby the lever is oscillated, and mechanism secured to the ear on the opposite end of the said split band and arranged to be operated on by said lever when the latter is oscillated, substantially in the manner and for the purpose described.

7. A friction-clutch mechanism comprising a shaft, a member loosely rotating on said shaft, in combination with a split band encircling the hub of said member, ears on the ends of said band, an angular lever having bearings in the ears on one end of said band, mechanism secured to the ear on the other end of said band and extending to the opposite end of said band and having operative relation with said lever, a carrier secured to said shaft and taking about said split band, and means mounted on said shaft and adapted to be thrown into operative contact with said lever, substantially in the manner and for the purpose described.

8. A friction-clutch mechanism comprising a shaft having a loosely-rotating member thereon, in combination with a split band encircling the hub of said member, ears on the ends of said band, a lever having bearings in the ears on one end of said band, a latch secured to the ear on the other end of said band and having operative connection with said lever, a carrier rigidly secured to the shaft adjacent to the loosely-rotating member and split band, lugs on said carrier whereby the split band is concentrically held in place, mechanism slidably mounted on the shaft, and means whereby said slidably-mounted mechanism is thrown into operative relation with said lever, substantially in the manner and for the purpose set forth.

9. A friction-clutch mechanism comprising a shaft, a loosely-rotating member mounted thereon, in combination with a split band encircling the hub of said loosely-rotating member, said band provided with ears at points near its respective ends, a lever whose one end has bearings in the ears on one end of said band, said lever provided with a notch, a latch adjustably secured to the ear on the other end of said band and its free end being in operative relation with the notch in said lever, a carrier rigidly secured to the shaft adjacent the loosely-rotating member and split band, said carrier provided with a slot through which said lever extends, and mechanism slidably mounted on said shaft and adapted to be thrown into operative connection with the free end of said lever, substantially in the manner and for the purpose described.

10. A friction-clutch mechanism comprising a shaft and a loosely-rotating member thereon, in combination with a split band encircling the hub of said loosely-rotating member, said split band provided with ears and lug on its periphery, a carrier rigidly secured to the shaft, said carrier adapted to take about said split band and provided with lugs between which the lug on the split band takes, a lever whose one end has bearings in the ears on one end of said band, a latch adjustably secured to the ear on the other end of said band and having operative relation with said lever, and mechanism slidably mounted on said shaft and adapted to contact with the free end of said lever, substantially in the manner and for the purpose described.

11. A friction-clutch mechanism comprising a shaft, a loosely-rotating member thereon, in combination with a split band encircling the hub of said loosely-rotating member, said split band provided with ears on the ends of said band, two of said ears arranged longitudinally on one end of said band, and another ear arranged transversely on the other end of said band, a carrier rigidly secured to said shaft adjacent the loosely-rotating member and the split band and adapted to take about said split band, said carrier provided with a slot, a lever having bearings in the longitudinally-arranged ears on said band and taking through the slot in said carrier, mechanism secured to the transversely-arranged ear and having operative relation with the lever, and mechanism slidably mounted on said shaft and adapted to be thrown into operative contact with said lever whereby the loosely-rotating member is made to revolve with the shaft, substantially in the manner and for the purpose described.

12. A friction-clutch mechanism comprising a shaft and a loosely-mounted member thereon, a split band encircling the hub of said loosely-mounted member, ears longitudinally arranged on one end of said band and another ear transversely arranged on the other end of said band, a carrier rigidly secured to the shaft adjacent the loosely-rotating member and the split band, said carrier provided with a slotway, a lever extending through the slotway in said carrier and having bearings in the longitudinally-arranged ears on said split band, a latch adjustably secured in the transversely-arranged ear and extending into proximity to the lever, the lever provided with a cut-away portion with which the free end of said latch is adapted to be brought into contact, mechanism slidably mounted on the shaft and adapted to contact with said lever and bring the latter into operative connection with said latch, in combination with means for controlling said slidably-mounted mechanism, substantially in the manner and for the purpose described.

MICHAEL R. CONWAY.

Witnesses:
CLEMENS OSKAMP,
GEORGE HEIDMAN.